INVENTORS:
Harry Edwards, and
John Alexander Partridge,
BY Cushman, Darby & Cushman
ATTORNEYS.

United States Patent Office 3,035,775
Patented May 22, 1962

3,035,775
SPRAY GUN WITH MIXING MEANS
Harry Edwards and John Alexander Partridge, Manchester, England, assignors to Imperial Chemical Industries Limited, London, England, a corporation of Great Britain
Filed June 5, 1959, Ser. No. 818,362
Claims priority, application Great Britain June 9, 1958
4 Claims. (Cl. 239—142)

This invention relates to spray guns, especially valuable for the application of polyurethane foams.

It has already been proposed to apply polyurethane foams, made from the usual polyurethane-forming ingredients such as hydroxyl group-containing polyesters or polyethers, polyisocyanates, water, catalysts, etc. by means of conventional multiple-feed spray guns wherein the polyisocyanate and polyester are brought into contact only at the jets of the spray gun. Mixing of the polyurethane forming ingredients so obtained has been found to be inadequate and the resulting foam has been of too high density and poor in quality. Also, the rate of application has been slow.

We have now found that these disadvantages can be overcome by the use in the spray gun of a premixing chamber fitted with mechanical agitation.

Thus according to the present invention we provide a spray gun, especially valuable for applying polyurethane foams, comprising a mixing chamber provided with a stirrer and a plurality of inlets for the polyurethane-forming ingredients or the like, and an exit jet from said mixing chamber surrounded by an air jet or jets.

The stirrer may be of any suitable design, and it may be driven by an electric or pneumatic motor suitably mounted on the spray gun, or by a flexible drive.

One suitable form of stirrer is a shaft carrying a number of pegs. However when the spray gun is used for the application of polyurethane foams, using such a type of stirrer, there is an undesirable tendency for foam to build up in the longitudinal spaces between the pegs.

This disadvantage can be minimised or obviated by the use of a stirrer consisting of a multi-sided cylinder, the longitudinal corners of which clear the internal surface of the mixing chamber by only a small distance, for example 1 to 3 millimetres.

Because of ease of manufacture, the preferred stirrer is one having four sides, that is to say, of square cross-section. Stirrers having any number of sides, for example from 3 to 8, may be used.

The use of a multi-sided stirrer involves no appreciable loss of stirring efficiency at high rotational speeds, as compared with a pegged stirrer, but such a stirrer ensures considerably improved cleaning of the mixing chamber by the cleaning air blast.

An alternative form of stirrer which can be used consists of a plain cylinder having a diametral clearance in the barrel not exceeding about 6 millimetres. This stirrer possess the advantages described above for a multi-sided cylinder and owing to the increased shear imposed on the mix passing along the annular gap, it ensures extremely good mixing and a better textured foam.

Two inlets are normally sufficient when the spray gun is used for polyurethane foam. The polyisocyanate is usually fed to one inlet and the remaining ingredients are fed as a pre-mix to the other inlet. If desired, further inlets may be provided, for example for the additional incorporation of chopped glass fibre.

The exit jet is provided at the opposite end of the mixing chamber to the inlets and is surrounded by an air jet, conveniently concentric therewith. The spray pattern of the jet may be in the shape of a converging-diverging hollow cone as used in normal spray guns.

An additional air inlet may be fitted at the inlet end of the mixing chamber and may be used to blow out the contents of the chamber at the end of a spraying operation. This air inlet may also be used if it is desired to introduce air into the mix at any stage in the spraying operation.

Further air inlets may with advantages be inserted in the resin and isocyanate feed lines close to their junctions with the mixing chamber. These air inlets may be used to blow the ends of the feed lines clear of resin or isocyanate at the end of the spraying operation.

The incorporation of a baffle immediately behind the stirrer body and attached thereto and situated in front of the cavity at the rear of the spray gun into which the resin and air feeds discharge, prevents the flowing back of isocyanate into said cavity and helps to distribute the outflow of resin and cleaning air uniformly throughout the mixing chamber.

The use of such a baffle has been found to practically eliminate seizure and stoppage of the spray gun owing to foam production in the region of the bearing for the stirrer.

The bore of the mixing chamber can advantageously be reduced in the region of the aforesaid cavity since thereby there is even less tendency for isocyanate to flow back into said cavity.

The invention may be illustrated with reference to the accompanying drawings in which.

Figure 1:
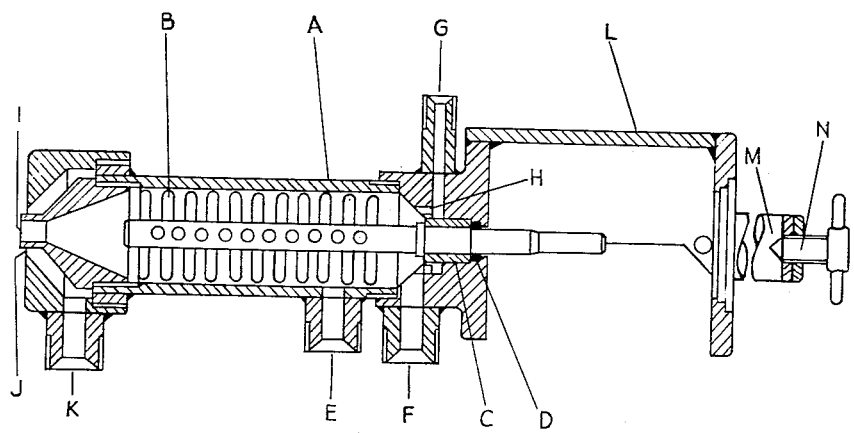
FIG. 1 shows a cross-section of one embodiment of the invention, employing a pegged stirrer.
Figure 2:
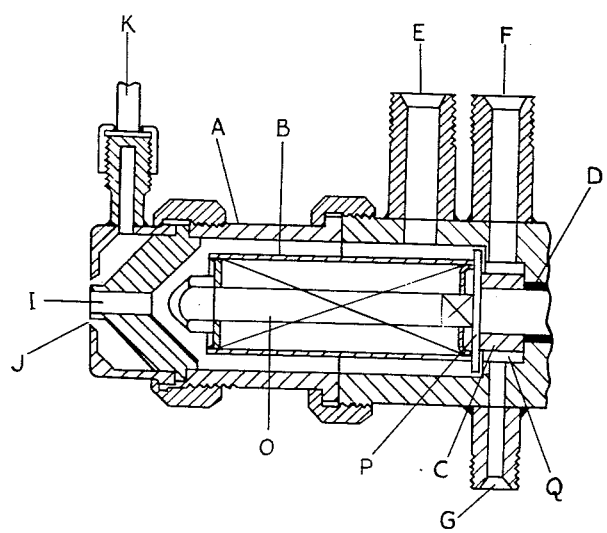
FIG. 2 shows a cross-section of another embodiment employing a cylindrical stirrer.

In the drawings, A is a mixing chamber provided with a stirrer B consisting of a pegged shaft in FIG. 1 or a cylinder of square cross-section mounted on a shaft O in FIG. 2 carried in a bearing C with sealing ring D. Inlets E and F are provided at one end of the mixing chamber and also a smaller inlet G (leading, in FIG. 1, through a circle of holes H into the extreme end of the mixing chamber). At the opposite end of the mixing chamber there is provided an exit jet I surrounded by an air jet J with an air inlet K.

In FIG. 2, a baffle P is mounted on the stirrer shaft O and is situated at the back of the square-sided cylinder of the stirrer and in front of the cavity Q at the rear of the mixing chamber. Inlets F and G discharge into cavity Q and the bore of the cavity is less than the bore of the main mixing chamber. As shown in FIG. 1, the mixing chamber is attached by a bracket L to a clamp M and screw N designed to hold a pneumatic drill, which is a convenient form of drive for the stirrer.

When the spray gun shown in the drawings is used for the application of polyurethane foam, the pneumatic drill is fitted in the clamp and the stirred shaft is gripped in the drill chuck. A polyester mix is fed to inlet F and a polyisocyanate is fed to inlet E. Air is fed to inlet K and the feed rates of the ingredients are adjusted to give the desired spraying conditions. At the end of the spraying operation, the polyisocyanate feed is stopped and the polyester feed is stopped and then air is fed to inlet G so as to clean out the mixing chamber. The polyurethane foam applied in the manner described above is of superior texture and of lower density compared with similar material applied using a conventional multiple feed spray gun. Furthermore, during the spraying operation there is an outstanding freedom from free isocyanate or free polyester or polyether entering the atmosphere surrounding the spraying operation.

The spray gun may also be used with other reactive materials which require thorough mixing.

What we claim is:

1. A spray gun for manufacturing polyurethane foams by interaction of polyisocyanates and polyesters and for application of said foams comprising a tubular mixing chamber, a cylindrical stirrer, means mounting said stirrer for rotation in said mixing chamber, a plurality of inlets into said mixing chamber for introducing reactant materials for formation of polyurethanes, an exit nozzle leading from said mixing chamber, an air nozzle surrounding the exit nozzle, means for supplying air to said air nozzle, whereby polyurethane formed in said mixing chamber is propelled by air on emergence from said exit nozzle, a baffle adjacent said stirrer, said baffle isolating a portion of said mixing chamber as an inlet cavity, at least one of said inlets feeding into said cavity for introduction of polyester uniformly into the stirred zone of said mixing chamber without back-flow of isocyanate into the polyester inlet.

2. A spray gun as set forth in claim 1 including an additional inlet into said cavity for supplying air to clean the mixing chamber.

3. A spray gun as set forth in claim 1 in which the bore of the mixing chamber is reduced in the region of said cavity.

4. A spray gun for manufacturing polyurethane foams by interaction of polyisocyanates and polyesters and for application of said foams comprising: a tubular mixing chamber having an inlet end portion and an outlet end portion, a multisided cylindrical stirrer; means mounting said stirrer for rotation in said mixing chamber, said stirrer having longitudinal corners spaced from the walls of said mixing chamber a distance of between about one and about three millimeters; a plurality of inlets into said inlet end portion of said mixing chamber for introducing reactant materials for formation of polyurethanes; an additional inlet into said inlet end portion of said mixing chamber for supplying air to clean said chamber; an exit nozzle leading from said outlet end portion of said mixing chamber; an air nozzle surrounding the exit nozzle and having an outlet opening generally coaxial with said exit nozzle; and means for supplying air to said air nozzle, whereby polyurethane formed in said mixing chamber is propelled by air or emergence from said exit nozzle.

References Cited in the file of this patent

UNITED STATES PATENTS

| | | |
|---|---|---|
| 1,948,401 | Smith | Feb. 20, 1934 |
| 1,957,705 | Ferguson | May 8, 1934 |
| 2,764,565 | Hoppe | Sept. 25, 1956 |
| 2,868,587 | Hegemann | Jan. 13, 1959 |
| 2,901,445 | Harris | Aug. 25, 1959 |